May 1, 1945.  E. R. FITCH  2,374,855
BRAKE MECHANISM
Filed Jan. 27, 1943
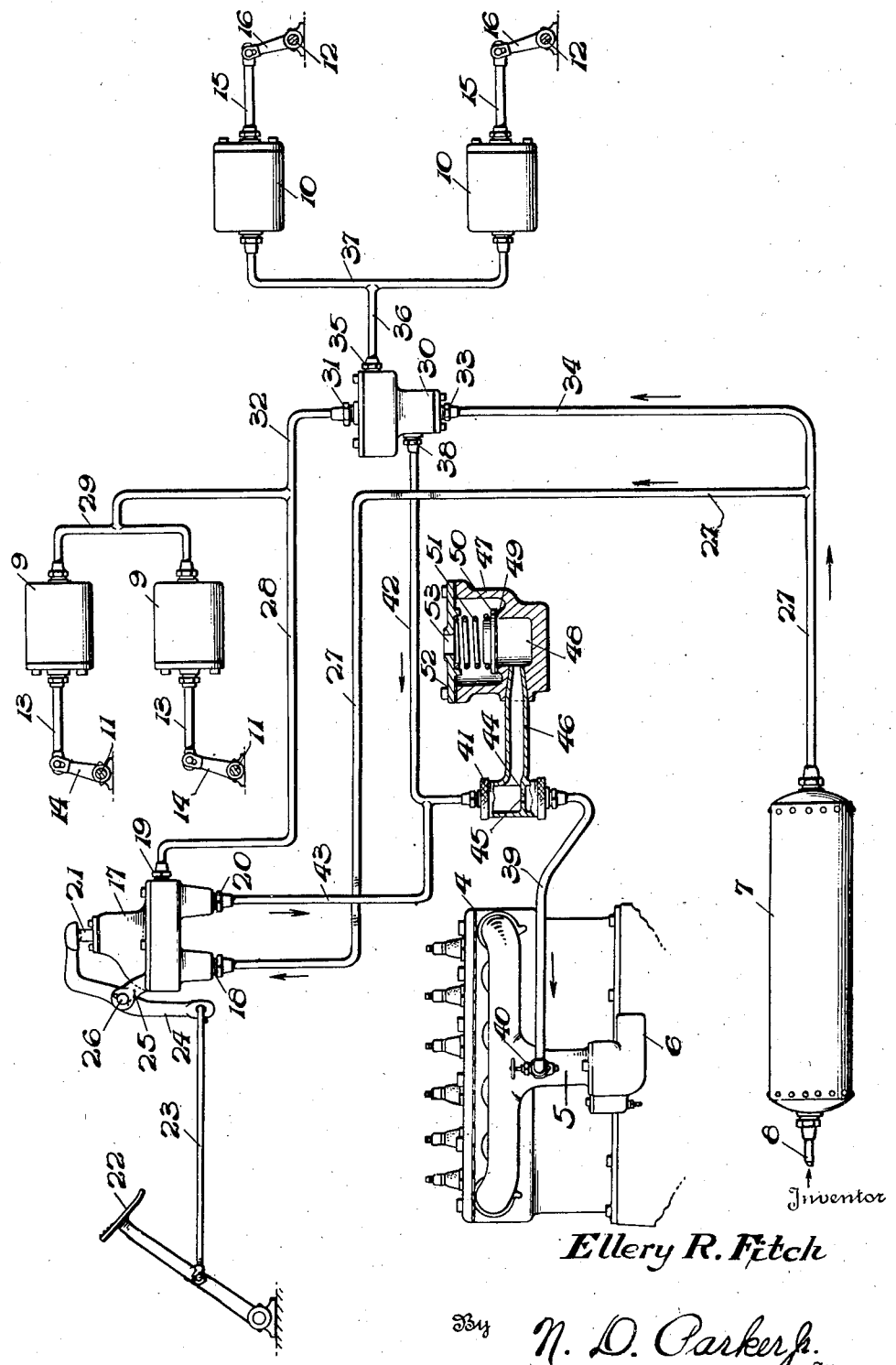
Inventor
Ellery R. Fitch
By N. D. Parker Jr.
Attorney Patented May 1, 1945

2,374,855

UNITED STATES PATENT OFFICE 2,374,855

BRAKE MECHANISM

Ellery R. Fitch, Elyria, Ohio, assignor to Bendix-Westinghouse Automotive Air Brake Company, Elyria, Ohio, a corporation of Delaware Application January 27, 1943, Serial No. 473,735

8 Claims. (Cl. 188—152)

This invention relates to a control mechanism for fluid motors, and more particularly to a system for controlling fluid pressure in a fluid motor adapted for the operation of vehicle brakes.

One of the difficulties encountered in connection with brake systems of this general type has been that of obtaining a rapid exhaust of fluid from the fluid motor serving to actuate the brakes, with a resultant slow release of the brakes, and it is accordingly an object of the present invention to provide means for overcoming this difficulty.

A further object of the invention is to provide means associated with the intake manifold of the internal combustion engine driving the vehicle for effecting this desirable result.

Yet another object of the invention is to provide means for automatically preventing the entrance of brake fluid from the fluid motor into the intake manifold in an amount sufficient to interfere with the satisfactory operation of the vehicle engine.

A further object is the provision of means for automatically exhausting a portion of the fluid in the motor directly to atmosphere when the amount of fluid to be evacuated from the motor is sufficient to otherwise overload the intake manifold of the engine.

These and other objects of the invention will be more readily apparent when taken in connection with the accompanying drawing, wherein one form of the invention is illustrated. It is to be expressly understood, however, that the drawing is employed for purposes of illustration only, and is not designed as a definition of the limits of the invention, reference for this purpose being had to the appended claims.

In the drawing, the single view is a diagrammatic representation, partially in section, of a fluid motor control system constructed in accordance with the principles of the present invention.

Referring to the drawing, the invention is illustrated as including an engine 4, which may be the driving engine of the vehicle, this engine being provided with the usual intake manifold 5 and a carburetor 6. A fluid pressure brake system of a conventional type is also included, this system having a fluid pressure supply reservoir 7 supplied with fluid under pressure through a conduit 8, as from an air compressor, not shown, and having a pair of front brake actuators 9 and a pair of rear brake actuators 10, these actuators being supplied with pistons, not shown, and being connected with front brake camshafts 11 and the rear brake camshafts 12 by means of piston rods 13 and levers 14 in the case of the front brake actuators and by means of piston rods 15 and levers 16 in case of the rear brake actuators.

In order that the pressure in the brake actuators may be satisfactorily controlled, a control valve 17 is provided having an inlet connection 18, an outlet connection 19 and an exhaust connection 20, the valve being provided with a slidable operating plunger 21 actuated by an operator's pedal 22 through the medium of a connecting rod 23 and a brake valve lever 24, pivotally mounted on the valve 17 by means of a bracket 25 and a pivot pin 26, this valve being preferably of the self-lapping type and constructed in accordance with the principles set forth in Lewis Patent No. 1,533,322 issued April 14, 1925, and generally illustrated in Fig. 1 thereof. Depression of the plunger 21 on movement of the pedal 22 to the left serves to connect the inlet connection 18 with the outlet connection 19, while reverse movement of the plunger serves to connect outlet connection 19 with exhaust connection 20, the construction of the valve being such, as explained in the patent, that the pressure supplied to the outlet connection 19 is determined by the position of the plunger 21 and the control lever 24. In order that fluid pressure may be supplied to and released from the actuators 9 by the operation of the valve 17, the inlet connection 18 is connected to the reservoir 7 by means of a conduit 27, the outlet connection 19 being connected to the actuators by means of conduits 28 and 29.

In the particular brake system illustrated, the supply of fluid pressure to the rear brake actuators 10 is controlled by means of a relay valve 30, which is preferably constructed in accordance with the principles set forth in Eaton and Vorech Patent No. 2,018,202, issued October 22, 1935, this valve being controlled by fluid pressure from the brake valve 17, and being so constructed as to connect the source of fluid pressure with the rear brake actuators when pressure is supplied to the valve by the brake valve 17, and to connect the rear brake actuators with atmosphere on release of fluid pressure from the relay valve by operation of the brake valve. The relay valve 30 is provided with a control connection 31 having a connection with the outlet conduit 28 of the brake valve through the medium of a conduit 32, an inlet connection 33 having a connection with conduit 27 through the medium of a conduit 34, an outlet connection 35 being connected with the rear brake actuators through the medium of conduits 36 and 37, and an exhaust connection 38. As explained in the above referred to patent, the relay valve is so constructed that on application of fluid pressure to the valve through conduit 32 and control connection 31, the inlet connection 33 is connected with the outlet connection 35 to supply fluid pressure from the reservoir 7 to the brake actuators 10, while on release of pressure from the relay valve through the control connection 31, the valve mechanism serves to establish a connection between the outlet connection 35 and the exhaust connection 38 to exhaust fluid from the brake actuators.

In systems of the above type wherein one or more control valves have been utilized to control the operation of the brake actuators, it has been customary to connect the exhaust connections of the valves with atmosphere, and this has oftentimes resulted in a relatively slow release of fluid pressure from the brake actuators, with the result that the brakes have tended to drag due to the slow release. Since with the vehicle engine 4 running, the pressure in the exhaust manifold 5 is normally considerably below that of the surrounding atmosphere, the speed of release of fluid from the brake actuators can be increased by connecting the exhaust connectors of the control valves to the interior of the manifold, and in the present instance this is accomplished by the medium of a conduit 39 connected at one end to the intake manifold through the medium of an adjustable valve 40, and connected at the other end to the exhaust connection 38 of the relay valve through a fitting 41, later to be described in further detail, and a conduit 42, and to the exhaust connection 20 of the brake valve 17 through the medium of a conduit 43 connected to the conduit 42. Thus, with the valve 40 in open position, and with the vehicle engine running, it will be understood that the exhaust connections 20 and 38 of the brake valve and relay valve respectively, will always be subjected to a pressure below atmospheric, with the result that on operation of the valves to release fluid pressure from the brake actuators, the fluid will be rapidly sucked into the intake manifold by the operation of the engine and the brake actuators will be rapidly evacuated. Since it is undesirable in some cases to admit a large quantity of air to the intake manifold of the engine, due to difficulties with carburetion, and the like, the interior of the fitting 41 is provided with a partition 44, this partition in turn being provided with a restricted passage 45, which serves to limit the amount of fluid which can be admitted to the intake manifold. In order to provide a finer adjustment of the amount of fluid which may be admitted to the intake manifold, the valve 40 is also provided, which may be adjusted to limit the flow of fluid into the intake manifold from zero to any desired quantity.

In the event the restriction 45 and the opening of the valve 40 are made sufficiently large, no particular amount of pressure will be built up in the exhaust conduits 42 and 43 on exhaust operation of the control valve, but in cases where it is found necessary to materially restrict the flow of air into the intake manifold either by means of the choke 45 or the control valve 40, it will be obvious that a pressure considerably in excess of atmospheric pressure may obtain in conduits 42 and 43, and in order to relieve this pressure, a relief valve fitting is connected with the fitting 41 by means of a hollow passage 46 formed integrally therewith, this relief valve being provided with a body portion 47 having a chamber 48 connected with the interior of the fitting 41 above the partition 44 by means of the passage 46, the upper end of the chamber 48 being provided with a valve seat 49, and a check valve 50 normally being pressed against this seat by means of a spring 51 interposed between the upper face of the valve and the lower face of a closure member 52 carried by the relief valve body 47. The central portion of the closure member 52 is provided with an exhaust port 53, and the tension of the spring 51 is so chosen that the valve 50 will be opened when the pressure in the chamber 48 exceeds atmospheric pressure by a predetermined small value, the relief valve thus serving to prevent the building up of appreciable back pressure in the conduits 42 and 43 with resultant delay in the release of fluid pressure from the brake actuators and in the release of the brakes.

With the above described system in operation, and with the vehicle engine running, the actuators 9 will be connected with the exhaust connection 20 of the brake valve 17 through the valve, while the actuators 10 will be connected with the exhaust connector 38 of the relay valve, and since these connectors are in turn connected with the interior of the intake manifold of the engine as previously described, all of the brake actuators will normally be maintained at the pressure obtaining in the intake manifold, which pressure will be considerably below atmospheric pressure. On depression of the brake pedal 22, reservoir 7 will be connected with the actuators 9 through conduit 27, inlet connector 18, valve 17, outlet connector 19, and conduits 28 and 29, while due to the application of pressure to the control connection 31 of the relay valve from the brake valve, inlet connection 33 of the relay valve will be connected with outlet connection 35 and fluid pressure will be supplied to the brake actuators 10 through conduits 27, 34, inlet connection 33, valve 30, outlet connection 35 and conduits 36 and 37. On release operation of the brake pedal conduit 28 will be connected with conduit 43 to exhaust fluid pressure from the relay valve and from the actuators 9 through the connections described, while conduit 36 and connection 35 of the relay valve will be connected with exhaust connection 38 and conduit 42 to exhaust fluid pressure from the brake actuators 10, and since the conduits 42 and 43 are connected with the intake manifold, fluid pressure will be rapidly exhausted from both the front and rear brake actuators, resulting in a rapid release of the brakes. In the event the brake valve is operated to fully release the brakes, an excessive positive pressure may be built up in conduits 42 and 43, in which case this positive pressure serves to open the relief valve 50 to release pressure to atmosphere and prevent the positive pressure in the lines 42 and 43 from building up to a point where it seriously interferes with the release of the brake mechanism. The amount of fluid which may be admitted to the intake manifold of the engine within a given period of time may be adjusted roughly by the size of the choke 45, and in the event a more accurate adjustment is desirable due to difficulties in carburetion, the valve 40 may be accurately adjusted to admit as much fluid as the engine will handle without interfering with proper carburetion.

Although the invention has been illustrated and described herein with considerable particularity, it is to be understood that the same is not limited to the form shown but may receive a variety of mechanical expressions, as will readily appear to those skilled in the art. Reference will, therefore, be had to the appended claims for a definition of the limits of the invention.

What is claimed is:

1. The combination in a vehicle having an engine provided with an intake manifold and a fluid pressure brake system including a source of fluid pressure, a fluid pressure operated brake actuator and a manually operable control valve for controlling the flow of fluid pressure to and from said actuator, of means cooperating with said valve and connected with the intake manifold whereby the latter is connected with the actuator through the valve when the valve is set to release fluid from the actuator for insuring a quick release from the actuator of the fluid supplied thereto by the control valve and a correspondingly quick release of the brakes.

2. The combination with a vehicle having an engine provided with an intake manifold and a fluid pressure brake system including a source of fluid pressure, a fluid pressure operated brake actuator and a manually operable control valve operable for supplying fluid pressure from the source to the actuator and for releasing fluid pressure from the actuator to release the brakes, of means for connecting the actuator with the intake manifold through the control valve on brake releasing operation of the valve, whereby the suction in the intake manifold serves to evacuate from the actuator the fluid supplied thereto by the control valve and to effect a quick release of the brakes.

3. The combination in a vehicle having an engine provided with an intake manifold and a fluid pressure brake system including a source of fluid pressure and a fluid pressure operated brake actuator, of manually operable valvular means for controlling the flow of fluid pressure to and from said actuator including an inlet port having a connection with said source, an outlet port having a connection with said actuator and an exhaust port for exhausting fluid from the actuator, and means for connecting said exhaust port with the intake manifold of said engine whereby the suction in said manifold is ultilized during brake releasing operation of the valvular means to exhaust from said actuator the fluid supplied thereto by the valvular means and effect a quick release of the brakes.

4. The combination with a vehicle having an engine provided with an intake manifold and a fluid pressure brake system having a source of fluid pressure, a pair of brake actuators, a control valve for controlling the flow of fluid pressure from said source to one of said brake actuators and for controlling the exhaust of fluid pressure from said actuator, a second control valve controlled by the first named valve for controlling the flow of fluid pressure from said source to said other actuator and for controlling the release of pressure therefrom, and means for connecting said intake manifold with both said brake actuators through said first and second named valves respectively whereby the suction in said manifold is utilized to effect a rapid exhaust of fluid from the actuators and a corresponding quick release of the brakes.

5. The combination in a vehicle having an engine provided with an intake manifold and a fluid pressure brake system having a reservoir, a fluid pressure operated brake actuator and a control valve operable for connecting the reservoir with the actuator for applying the brakes and for connecting the actuator with an exhaust port in the brake valve for exhausting fluid pressure from the actuator and releasing the brakes, of means for connecting said exhaust port with the intake manifold of the engine for effecting a quick release of fluid from the brake actuator on corresponding operation of the control valve, and means associated with said means connected to the intake manifold for exhausting a portion of said fluid directly to atmosphere when the pressure in said connecting means exceeds a predetermined value.

6. The combination in a vehicle having an engine provided with an intake manifold and a fluid pressure brake system having a reservoir, a fluid pressure operated actuator, and a control valve of the type having an inlet port connected with the reservoir, an outlet port connected with the actuator, an exhaust port, and means for alternately connecting the inlet and outlet ports to supply fluid pressure to the actuator to apply the brakes and for connecting the outlet port with the exhaust port for releasing fluid pressure from the actuator to release the brakes, of means for connecting the exhaust port with the intake manifold of the engine for effecting a quick release from the actuator of the fluid supplied thereto by the control valve, and means associated with said connection for limiting the amount of fluid which can be introduced into the intake manifold from the actuator in a given period of time.

7. The combination in a vehicle having an engine provided with an intake manifold and a fluid pressure brake system including a fluid pressure reservoir, a fluid pressure operated brake actuator and a control valve having an inlet port connected with the reservoir, an outlet port connected with the actuator, an exhaust port, and means for alternately connecting the inlet port and outlet port for supplying fluid pressure to the actuator and for connecting the outlet port with the exhaust port for releasing fluid pressure from the actuator on corresponding operation of the valve, of means for effecting a quick release of fluid from the actuator on connection of said outlet and exhaust ports including a connection with the intake manifold of the engine and adjustable means associated therewith for limiting the amount of fluid introduced into the intake manifold during a given period of time.

8. The combination in a vehicle having an engine provided with an intake manifold, of a brake system having a source of fluid pressure, a fluid pressure operated brake actuator, and means for alternately supplying fluid pressure to the actuator from the reservoir and evacuating fluid pressure from the actuator including a control valve having means for connecting the reservoir with the actuator to apply the brakes and having means for connecting the actuator with the intake manifold of the engine to evacuate fluid from the actuator, and means associated with said last named means for limiting the amount of fluid introduced into said intake manifold during evacuation of said actuator including a restriction in said manifold connection and valvular means for exhausting said fluid directly to atmosphere when the pressure in said connection exceeds a predetermined value.

ELLERY R. FITCH.